United States Patent [19]

Nakamura et al.

[11] Patent Number: 5,748,307
[45] Date of Patent: May 5, 1998

[54] IMAGE PICKUP APPARATUS

[75] Inventors: Hideo Nakamura; Haruki Furuta, both of Suwa, Japan

[73] Assignee: Chinon Kabushiki Kaisha, Nagano, Japan

[21] Appl. No.: 773,437

[22] Filed: Dec. 26, 1996

[30] Foreign Application Priority Data

Jan. 5, 1996 [JP] Japan .................. 8-000271
Jan. 18, 1996 [JP] Japan .................. 8-006615

[51] Int. Cl.$^6$ .............................. H04N 9/73; H04N 5/76
[52] U.S. Cl. ................... 358/296; 358/505; 358/516; 348/222
[58] Field of Search .................. 358/75, 505, 510, 358/909.1; 382/107, 313; 355/32, 77; 348/242, 282, 322, 70, 222, 223

[56] References Cited

U.S. PATENT DOCUMENTS

| | | | |
|---|---|---|---|
| 5,428,389 | 6/1995 | Ito et al. | 348/231 |
| 5,517,239 | 5/1996 | Nakayama | 348/222 |
| 5,541,648 | 7/1996 | Udagawa et al. | 348/222 |
| 5,579,047 | 11/1996 | Yamagami et al. | 348/242 |
| 5,581,298 | 12/1996 | Sasaki et al. | 348/222 |

*Primary Examiner*—Peter S. Wong
*Assistant Examiner*—Gregory J. Toatley, Jr.
*Attorney, Agent, or Firm*—Hickman Beyer & Weaver

[57] ABSTRACT

There is provided an image pickup apparatus excellent in color reproducibility without requiring a complicated circuit. In image pickup operation, a sum pixel signal ($S_{CCD}$) output from a color image pickup element (100) is converted into digital sum pixel data ($D_{CCD}$) through a sample/hold circuit (102) and an A/D converter (104). The digital sum pixel data is stored and held in a frame memory (106). In image reproduction, an arithmetic operation unit (108) executes an arithmetic processing program in a program memory (110) to read out the sum pixel data ($D_{CCD}$) from the frame memory (106). The pixel data are multiplied by predetermined white balance adjustment coefficients, and color difference signals (B-Y) and (R-Y) of the horizontal lines are calculated. In order to complement color difference signals of horizontal lines which are short, the color difference signals (B-Y) and (R-Y) are added and averaged in accordance with predetermined relations to form color difference signals of all horizontal lines, thereby realizing image reproduction excellent in color reproducibility.

5 Claims, 15 Drawing Sheets

Fig. 6

|  | mTH ROW |  | (m+2)TH ROW |  |  |  |
|---|---|---|---|---|---|---|
| ... | Cy | Ye | Cy | Ye | ... | nTH HORIZONTAL LINE |
| ... | Mg | G | Mg | G | ... |  |
| ... | Cy | Ye | Cy | Ye | ... | (n+1)TH HORIZONTAL LINE |
| ... | G | Mg | G | Mg | ... |  |
| ... | Cy | Ye | Cy | Ye | ... | (n+2)TH HORIZONTAL LINE |
| ... | Mg | G | Mg | G | ... |  |
| ... | Cy | Ye | Cy | Ye | ... | (n+3)TH HORIZONTAL LINE |
| ... | G | Mg | G | Mg | ... |  |

(m+1)TH ROW   (m+3)TH ROW

Fig. 7

|  | mTH ROW | (m+2)TH ROW |  |  |
|---|---|---|---|---|
| ... | Mg+Cy | G+Ye | Mg+Cy | G+Ye | ... nTH HORIZONTAL LINE |
| ... | G+Cy | Mg+Ye | G+Cy | Mg+Ye | ... (n+1)TH HORIZONTAL LINE |
| ... | Mg+Cy | G+Ye | Mg+Cy | G+Ye | ... (n+2)TH HORIZONTAL LINE |
| ... | G+Cy | Mg+Ye | G+Cy | Mg+Ye | ... (n+3)TH HORIZONTAL LINE |

(m+1)TH ROW   (m+3)TH ROW

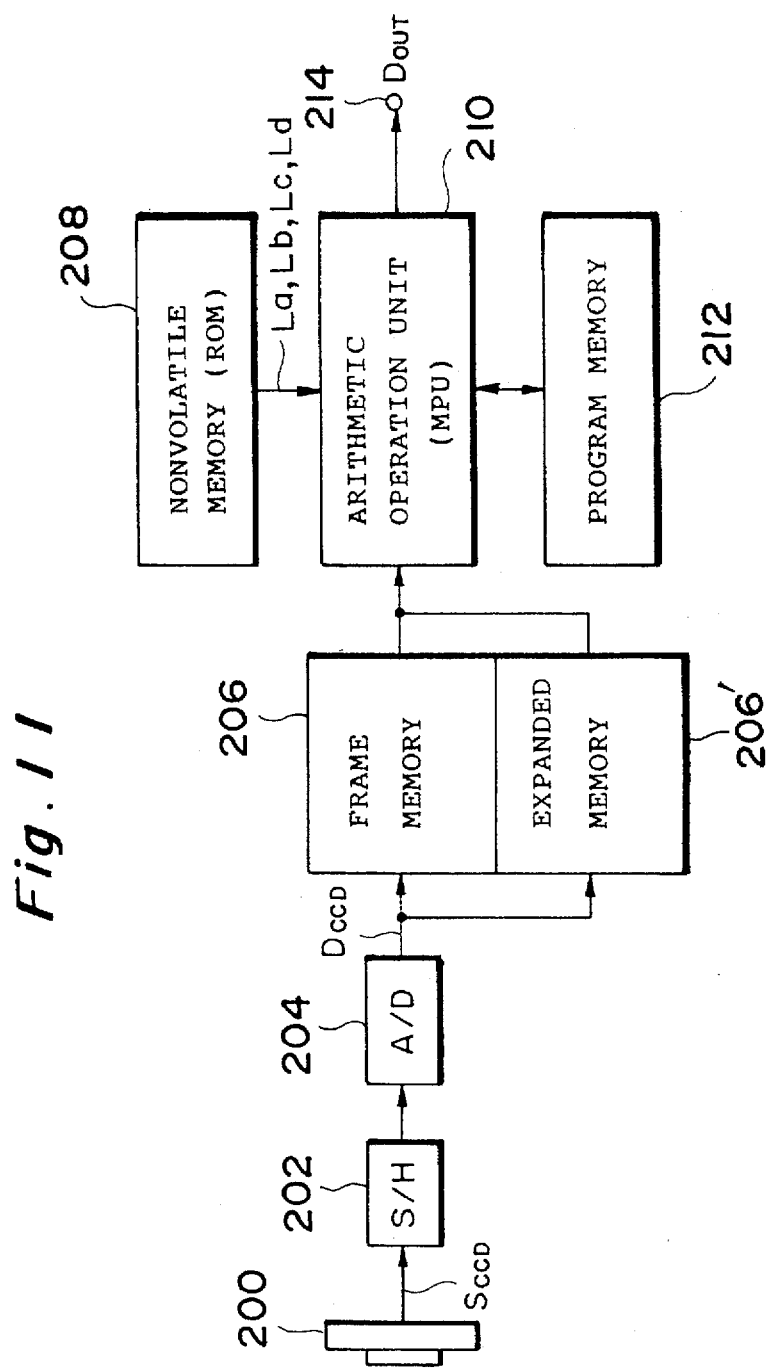

Fig. 12

|  | mTH ROW |  | (m+2)TH ROW |  |  |
|---|---|---|---|---|---|
| ... | Cy | Ye | Cy | Ye | ... } nTH HORIZONTAL LINE |
| ... | Mg | G | Mg | G | ... |
| ... | Cy | Ye | Cy | Ye | ... } (n+1)TH HORIZONTAL LINE |
| ... | G | Mg | G | Mg | ... |
| ... | Cy | Ye | Cy | Ye | ... } (n+2)TH HORIZONTAL LINE |
| ... | Mg | G | Mg | G | ... |
| ... | Cy | Ye | Cy | Ye | ... } (n+3)TH HORIZONTAL LINE |
| ... | G | Mg | G | Mg | ... |

(m+1)TH ROW   (m+3)TH ROW

Fig. 13

|  | mTH ROW |  | (m+2)TH ROW |  |  |
|---|---|---|---|---|---|
| ... | Mg+Cy | G+Ye | Mg+Cy | G+Ye | ... nTH HORIZONTAL LINE |
| ... | G+Cy | Mg+Ye | G+Cy | Mg+Ye | ... (n+1)TH HORIZONTAL LINE |
| ... | Mg+Cy | G+Ye | Mg+Cy | G+Ye | ... (n+2)TH HORIZONTAL LINE |
| ... | G+Cy | Mg+Ye | G+Cy | Mg+Ye | ... (n+3)TH HORIZONTAL LINE |

(m+1)TH ROW   (m+3)TH ROW

IMAGE PICKUP APPARATUS

BACKGROUND OF THE INVENTION

1. Field of the Invention

The present invention relates to an image pickup apparatus such as an electronic still camera and, more particularly, to white balance adjustment.

2. Related Background Art

In an image pickup apparatus such as an electronic still camera or a video camera, white balance adjustment is performed such that chrominance signals are balanced in accordance with the color temperature of illumination light, and a white object is reproduced in white, thereby improving color reproducibility. For example, a technique disclosed in Japanese Patent Laid-Open No. 5-252521 is known.

According to such a conventional technique, a one-plate system using one two-dimensional color solid-state image pickup device (color CCD) is employed. As shown in FIG. 1, two pixel columns are arranged for each of horizontal lines N, N+1, N+2, ..., and a color filter in which combinations of four pixel color filters of cyan (Cy), magenta (Mg), yellow (Ye), and green (G) are staggered between adjacent horizontal lines is arranged to perform color image pickup. A matrix circuit comprising an analog circuit shown in FIG. 2 is connected to this color CCD.

Pixel signals generated by a pixel group in accordance with an image pickup operation are read in units of horizontal lines in synchronism with a horizontal scanning read period $T_H$. The pixel signals are sampled and held by a pair of sample/hold (S/H) circuits 2 and 4 in synchronism with a dot sequential timing period $\tau_p$. A first pixel group column having cyan (Cy) and yellow (Ye) pixel filters and a second pixel group column having magenta (Mg) and green (G) pixel filters are arranged for each horizontal line. For this reason, as shown in the timing chart of FIG. 3, pixel signals from two pixels of the first and second columns located on the same line are added (mixed), and the added pixel signals are alternately sampled and held by the sample/hold circuits 2 and 4, thereby obtaining chrominance signals separated in units of pixels (strictly speaking, signals separated every two pixels).

The sample/hold circuits 2 and 4 are connected to 1H (one horizontal period) delay circuits 6 and 8, respectively. Gain control circuits 12 to 18 are connected to the sample/hold circuits 2 and 4 and the 1H delay circuits 6 and 8 through a switch circuit 10. Subtracters 20 and 22 are arranged to calculate the differences between predetermined ones of output signals from the gain control circuits 12 to 18.

The 1H delay circuits 6 and 8 delay chrominance signals output from the sample/hold circuits 2 and 4 by a 1H period $T_H$ each. The switch circuit 10 performs switching operations so as to always input chrominance signals derived from the same combinations of pixel filters to the gain control circuits 12 to 18. As a result, as shown in FIG. 4, the subtracter 20 outputs a color difference signal R-Y, and the subtracter 22 outputs a color difference signal B-Y. In addition, the gains of the gain control circuits 12 to 18 are independently adjusted to perform white balance adjustment.

SUMMARY OF THE INVENTION

It is an object of the present invention to provide an image pickup apparatus comprising a systematic, simple circuit arrangement and having white balance adjustment functions of improving vertical reproducibility of color information, easily coping with various color CCDs, and improving color reproducibility of a reproduced image, none of which can be achieved by any conventional system.

In order to achieve the above object, the present invention comprises: a color image pickup element in which a first pixel column having a plurality of pixels with cyan and yellow pixel color filters alternately arranged in a horizontal line direction and a second pixel column having a plurality of pixels with magenta and green pixel color filters alternately arranged in the horizontal line direction are alternately arranged in a vertical direction, each pair of the first pixel column and the second pixel column constitute each horizontal line, pixel signals generated by the plurality of pixels are combined in units of first and second pixel columns, and pixel signals of two pixels adjacent in the vertical direction are mixed and output, thereby performing horizontal scanning and reading of a sum pixel signal for each horizontal line; an A/D converter for converting each sum pixel signal read from the color image pickup element into digital sum pixel data; a storage medium for storing the sum pixel data output from the A/D converter in correspondence with a pixel arrangement of the color pickup element; and an arithmetic operation unit for adjusting a white balance of the sum pixel data stored in the storage medium. Upon execution of an arithmetic processing program, the arithmetic operation unit performs multiplications of white balance adjustment correction coefficients unique to the respective sum pixel data, calculates a first color difference signal (B-Y) of each pixel in accordance with the multiplied sum pixel data corresponding to magenta and cyan and the multiplied sum pixel data corresponding to green and yellow, calculates a second color difference signal (R-Y) of each pixel in accordance with the multiplied sum pixel data corresponding to magenta and yellow and the multiplied sum pixel data corresponding to green and cyan, adds and averages the second color difference signals (R-Y) adjacent to each other in the vertical direction to calculate a first complementary color difference signal for a pixel column of the first color difference signal (B-Y) serving as a signal between the second color difference signals, and adds and averages the first color difference signals (B-Y) adjacent to each other in the vertical direction to calculate a second complementary color difference signal for a pixel column of the second color difference signal (R-Y) serving as a signal between the first color difference signals.

According to an image pickup apparatus according to another aspect of the present invention, the correction coefficients to be multiplied by the sum pixel data corresponding to magenta and yellow serve as reference values, and the correction coefficients to be multiplied by the remaining sum pixel data serve as proportional coefficients with respect to the reference values, so that the multiplication of the correction coefficients with the sum pixel data corresponding to magenta and yellow can be omitted.

According to still another aspect of the present invention, the present invention comprises: a color image pickup element in which a first pixel column having a plurality of pixels with cyan and yellow pixel color filters alternately arranged in a horizontal line direction and a second pixel column having a plurality of pixels with magenta and green pixel color filters alternately arranged in the horizontal line direction are alternately arranged in a vertical direction, each pair of the first pixel column and the second pixel column constitute each horizontal line, pixel signals generated by the plurality of pixels are combined in units of first and second pixel columns, and pixel signals of two pixels adjacent in the vertical direction are mixed and output, thereby performing horizontal scanning and reading of a sum pixel signal for each horizontal line; an A/D converter for converting each sum pixel signal read from the color image pickup element into digital sum pixel data; a first storage medium for storing the sum pixel data output from the A/D converter in correspondence with a pixel arrangement of the color pickup element; a second storage medium for prestoring, as reference correction coefficients, white balance correction coefficients obtained upon photography under a reference color temperature light source; a third storage medium for prestoring various color temperature correction coefficients corresponding to ratios of the white balance correction coefficients obtained upon photography at various light source color temperatures to the reference correction coefficients; and an arithmetic operation unit for executing a predetermined arithmetic processing program to adjust white balance by multiplying the sum pixel data stored in the first storage medium by the reference correction coefficients in the second storage medium and the color temperature correction coefficients corresponding to the light source color temperature obtained upon photography and stored in the third storage medium.

Preferably, the arithmetic operation unit obtains an average-of-sum value of the sum pixel data for each color when the color temperature correction coefficient corresponding to the light source color temperature upon photography is not present, predicts and calculates, as an automatic color temperature correction coefficient, an unknown color temperature correction coefficient which satisfies a condition in which white-balance-adjusted color difference signals obtained by applying the reference correction coefficients and the unknown color temperature correction coefficient to the average-of-sum value become zero, and multiplies the sum pixel data stored in the first storage medium by the reference correction coefficient in the second storage medium and the automatic color temperature correction coefficient, thereby adjusting the white balance.

Further, the arithmetic operation unit preferably adds and averages the calculated color difference signals adjacent to each other in the vertical direction of the pixel arrangement, thereby calculating complementary color difference signals which are shortages of the color difference signals.

The third storage medium preferably receives the color temperature correction coefficients and the arithmetic processing program from an external storage medium.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 6 is a view for explaining, as a representative, part of the arrangement of the light-receiving surface of a color CCD applied to the first embodiment;

FIG. 7 is a view for explaining the array of sum pixel signals read from the color CCD applied to the first embodiment;

FIG. 11 is a block diagram showing the main part of the third embodiment according to the present invention;

FIG. 12 is a view for explaining, as a representative, part of the arrangement of the light-receiving surface of a color CCD applied to the third embodiment;

FIG. 13 is a view for explaining the array of sum pixel signals read from the color CCD applied to the third embodiment;

DESCRIPTION OF THE PREFERRED EMBODIMENTS

In the prior art shown in FIGS. 1 to 4, it is difficult to realize a compact image pickup apparatus because an analog circuit having a complicated hardware arrangement is required. Since the line complementary characteristics of the color difference signals B-Y and R-Y are simply compensated for by the 1H delay circuits, the vertical reproducibility of color information is not so good. As the information volume of a finally obtained video signal becomes triple the number of pixels of the color CCD, the information volume becomes redundant and is not proper. In addition, control becomes complicated because the four color information parameters are present.

Unless the color difference signals B-Y and R-Y are formed on the basis of the pixel signals corresponding to the arrangement of the respective color pixel filters on the pixels of the color CCD, color reproducibility degradation such as false color formation occurs in the reproduced image. Since the color filter arrangement varies depending on the types of color CCDs used for image pickup apparatuses, the analog hardware circuit must be changed each time.

(First Embodiment)

The first embodiment of the present invention will be described with reference to the accompanying drawings. Note that the first embodiment exemplifies an electronic still camera for electronically picking up an object image.

The arrangement of the main part of this electronic still camera will be described with reference to FIG. 5. A sample/hold (S/H) circuit 102 and an A/D converter 104 are sequentially connected in series with the output contact of a two-dimensional color solid-state image pickup element (color CCD) 100. A frame memory 106 comprising a so-called SRAM for storing at least one-frame image data is connected to the output contact of the A/D converter 104. An arithmetic operation unit 108 having an arithmetic operation function and comprising a microprocessor (MPU) is connected to the output contact of the frame memory 106. An external terminal (i.e., a terminal for connected to an external device through a plug) 112 arranged on the housing or the like of the electronic still camera is connected to the output contact of the arithmetic operation unit 108.

Figure 1:
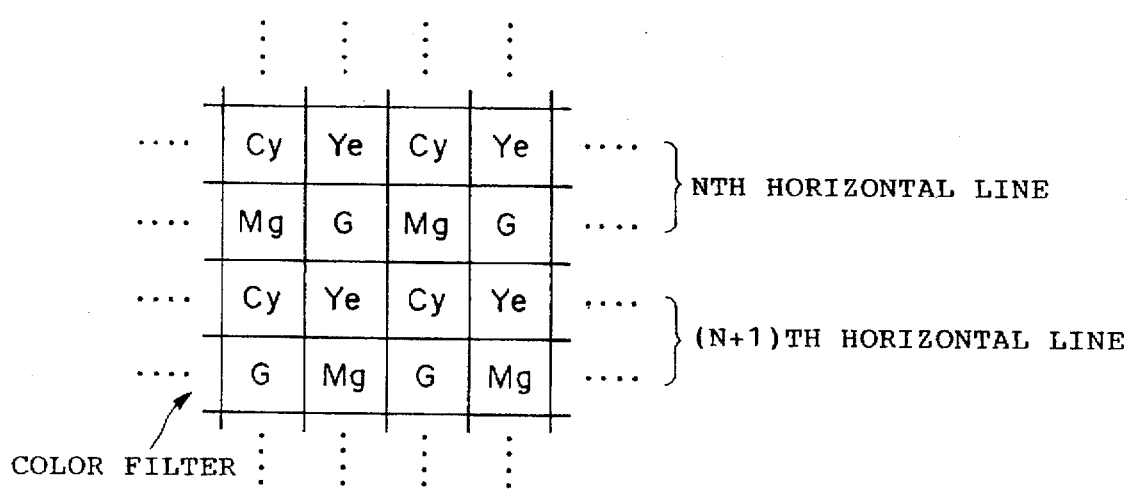
FIG. 1 is a view for explaining the structure of the light-receiving surface of a color CCD applied to a conventional electronic still camera.
Figure 2:
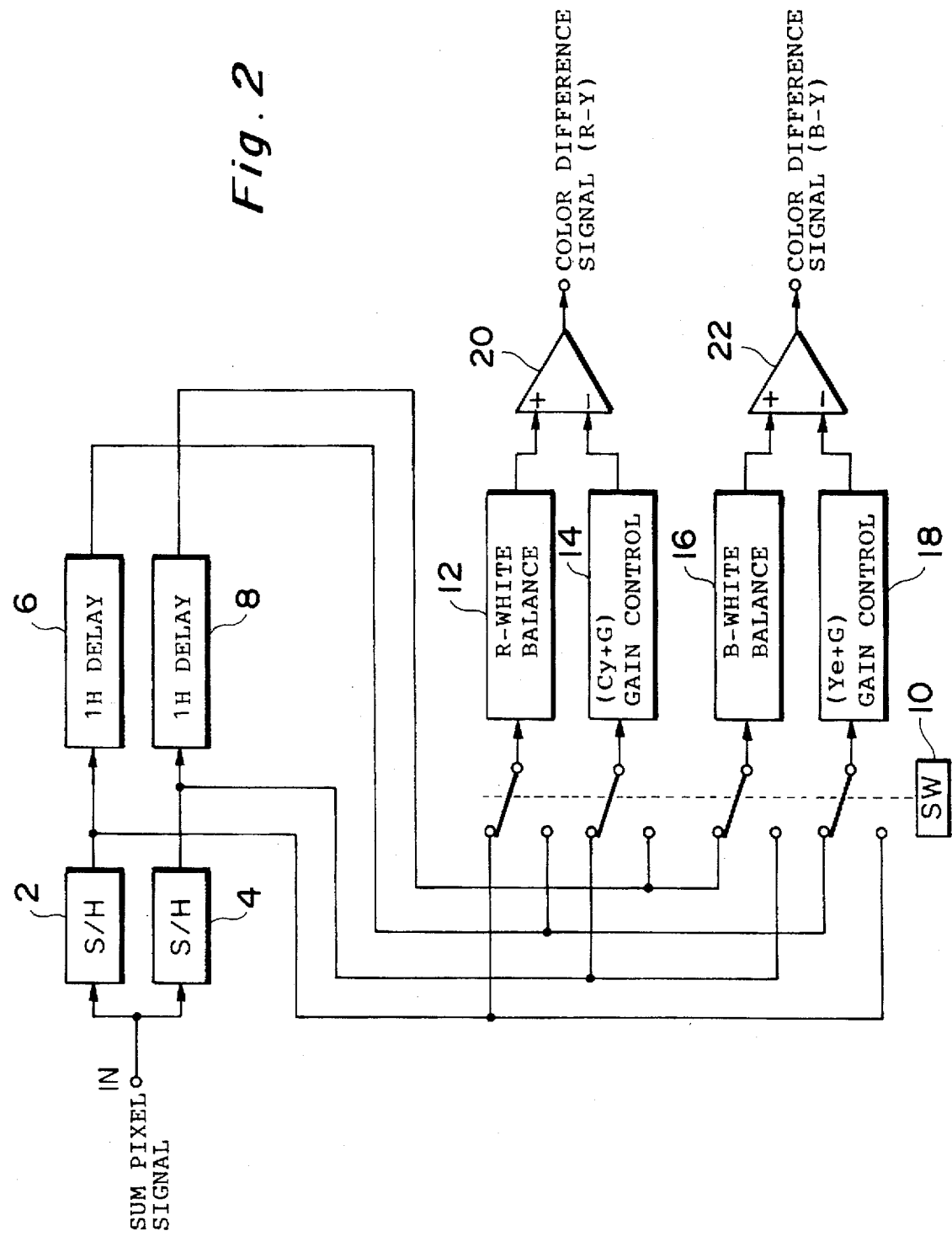
FIG. 2 is a block diagram showing the arrangement of the conventional electronic still camera.
Figure 3:
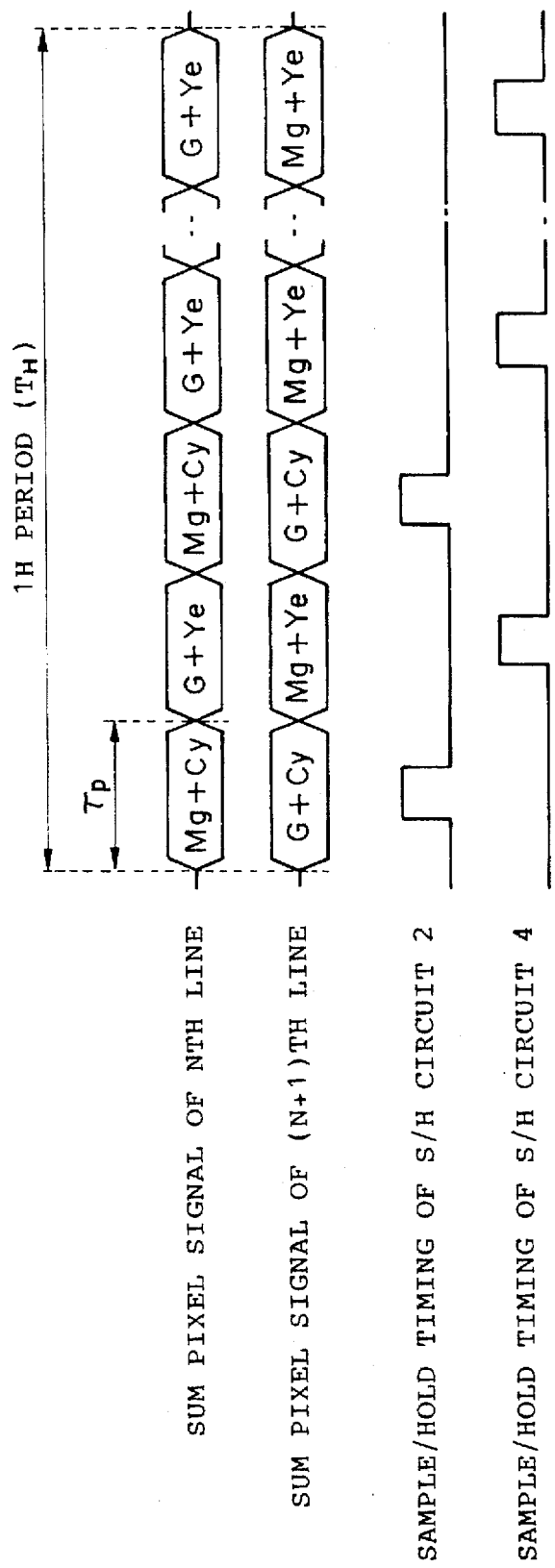
FIG. 3 is a timing chart showing the output timings of sum pixel signals read from the color CCD applied to the conventional electronic still camera.
Figure 4:
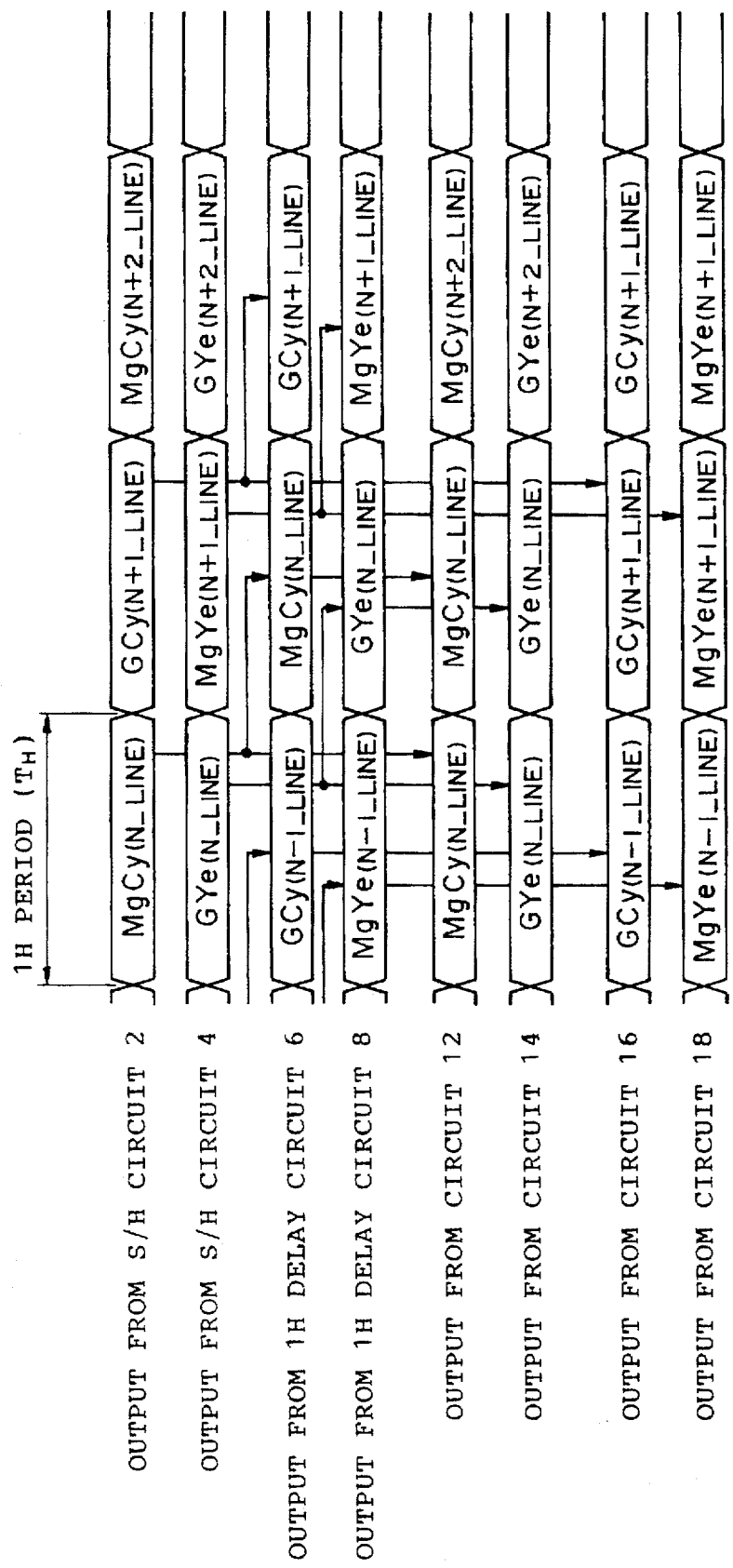
FIG. 4 is a timing chart showing the white balance adjustment processing timings in the conventional electronic still camera.
Figure 5:
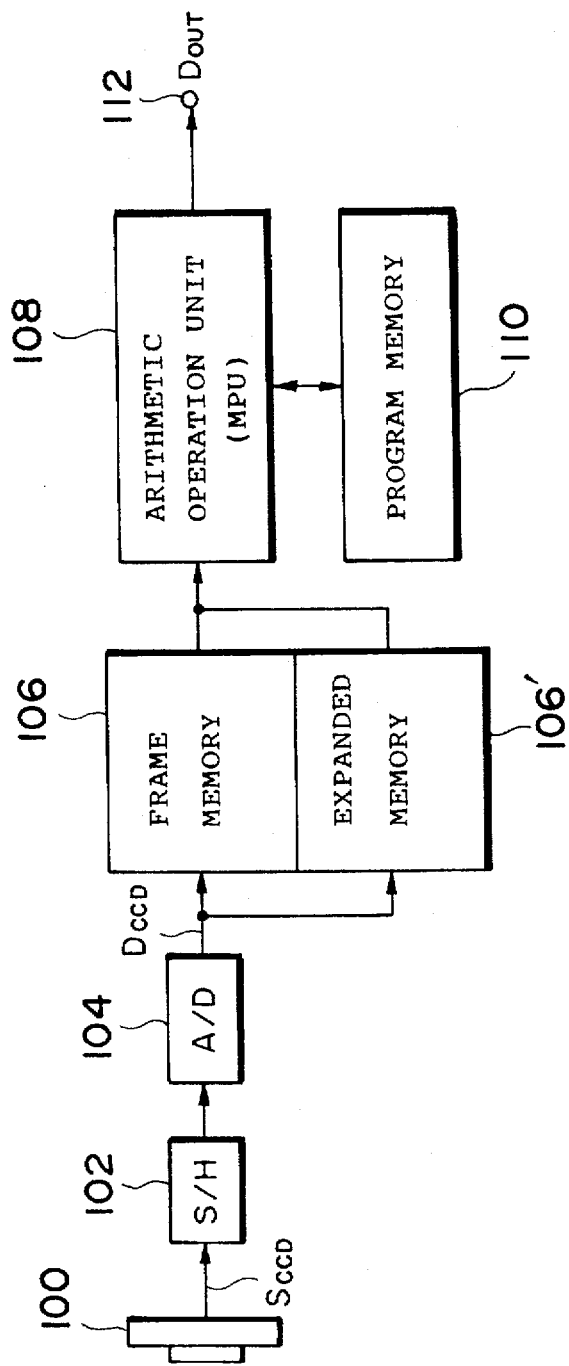
FIG. 5 is a block diagram showing the main part of the first embodiment according to the present invention.

Note that although the A/D converter 104, the frame memory 106, and the arithmetic operation unit 108 are connected in series with each other in FIG. 5, the A/D converter 104 and the frame memory 106 are actually connected through a so-called data bus extending from the arithmetic operation unit 108. The arithmetic operation unit 108 performs control on the basis of predetermined synchronization timings to transfer data between the above constituent components 104, 106, and 108.

An expanded memory 106' which is of the same type as that of the frame memory 106 may be connected to a memory expansion connector (not shown) connected to the above data bus to store data of a large number of frames. Alternatively, a memory card or a dedicated external memory device may be connected in place of the memory, thereby storing pixel data of a large number of frames.

The arithmetic operation unit 108 is connected to a program memory 110 which stores an arithmetic processing program for white balance adjustment (to be described later). Upon execution of this arithmetic processing program, white balance adjustment is performed for the pixel data stored in the frame memory 106 or the expanded memory 106'. Color difference signals (B-Y) and (R-Y) formed on the basis of the adjusted pixel data are output to the external terminal 112.

The above arithmetic processing program can be supplied from a so-called floppy disk, memory card, or the like. This floppy disk or the like is inserted into a drive unit (not shown) mounted in the housing of the electronic still camera. When an operator inputs a predetermined command, the arithmetic processing program is written in the program memory 110 through the arithmetic operation unit 108. Note that a read-only memory (ROM) which prestores the arithmetic processing program may be used in place of the random access program memory (RAM) 110.

As shown in FIG. 6, the color CCD 100 is arranged such that pixel color filters of four colors, i.e., cyan (Cy), yellow (Ye), magenta (Mg), and green (G) are arranged in a predetermined array with respect to a plurality of pixels arranged in a two-dimensional array, thereby performing color image pickup. Pixel signals of two columns are added (mixed) in reading pixel signals accumulated in the respective pixels. The resultant sum pixel signal is read as a pixel signal for one horizontal line.

For example, the nth horizontal line includes a first pixel column in which cyan (Cy) and yellow (Ye) are alternately arranged, and a second pixel column in which magenta (Mg) and green (G) are alternately arranged. When the nth horizontal line is scanned to read pixel signals, a sum pixel signal $S_{CCD}$ including, e.g., (Mg+Cy), (G+Ye), (Mg+Cy), (G+Ye), . . . is automatically output depending on the arrangement of the charge transfer path formed in the color CCD 100. More specifically, the sum pixel signal is an analog signal time-serially read in units of pixels and consisting of (Mg+Cy), (G+Ye), (Mg+Cy), and (G+Ye). Any other horizontal line is also constituted by two pixel group columns as in the nth horizontal line. The sum pixel signals $S_{CCD}$ output from the color CCD 100 are output in an array of FIG. 7 with respect to the pixel array in FIG. 6.

Figure 8:
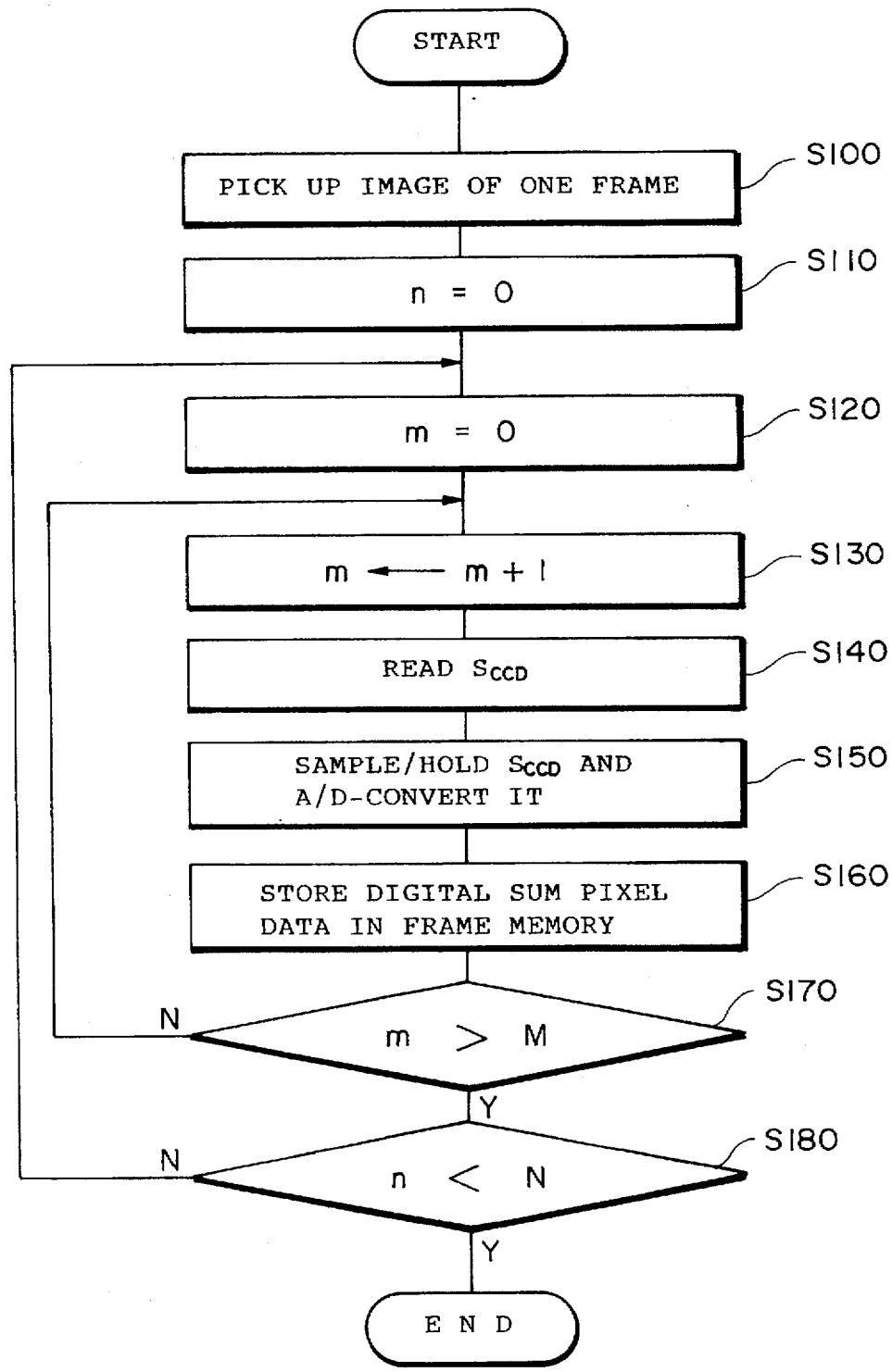
FIG. 8 is a flow chart for explaining an example of the image pickup operation of the first embodiment.

The operation of the electronic still camera having the above arrangement will be described with reference to flow charts in FIGS. 8 and 9. FIG. 8 shows the operation for photographing a one-frame still image, and FIG. 9 shows the operation for performing white balance adjustment and the like.

Referring to FIG. 8, when the operator depresses the shutter release button, a one-frame image is picked up by the color CCD 100 in step S100 to accumulate pixel charges corresponding to the object image in a pixel group. In steps S110 to S140, pixel signals are read in a predetermined order corresponding to the pixel array (n,m). More specifically, in step S140, each pixel charge is transferred inside the color CCD 100, and the sum pixel signal $S_{CCD}$ is read in synchronism with a predetermined dot sequential timing $\tau_p$. In step S150, each sum pixel signal $S_{CCD}$ read in synchronism with the dot sequential timing $\tau_p$ is sampled and held in the sample/hold circuit 102 and at the same time converted into sum pixel data $D_{CCD}$ of a predetermined gradation level by the A/D converter 104. In step S160, the sum pixel data $D_{CCD}$ are sequentially stored and held in the frame memory 106. In steps S170 and S180, it is determined whether an operation for reading all the sum pixel signals $S_{CCD}$ of one frame is completed. Processing in steps S120 to S160 is repeated until the read operation is completed. If YES in step S180, a series of image pickup operations are completed.

When the above photographic operation is performed, the sum pixel data $D_{CCD}$ corresponding to the array of the sum pixel signals $S_{CCD}$ are stored in the frame memory 106, as shown in FIG. 7. Since these sum pixel data $D_{CCD}$ are obtained by A/D-converting the sum pixel data $S_{CCD}$ by the A/D converter 104, the sum pixel data $D_{CCD}$ are stored in the frame memory 106 while the white balance of the data $D_{CCD}$ is not adjusted yet. When photography is started upon designating the expanded memory 106', the sum pixel data $D_{CCD}$ of one frame image are stored in the expanded memory 106'. When the second or subsequent still image is photographed, the sum pixel data $D_{CCD}$ corresponding to the second or subsequent frame are stored in the expanded memory 106'.

Figure 9:
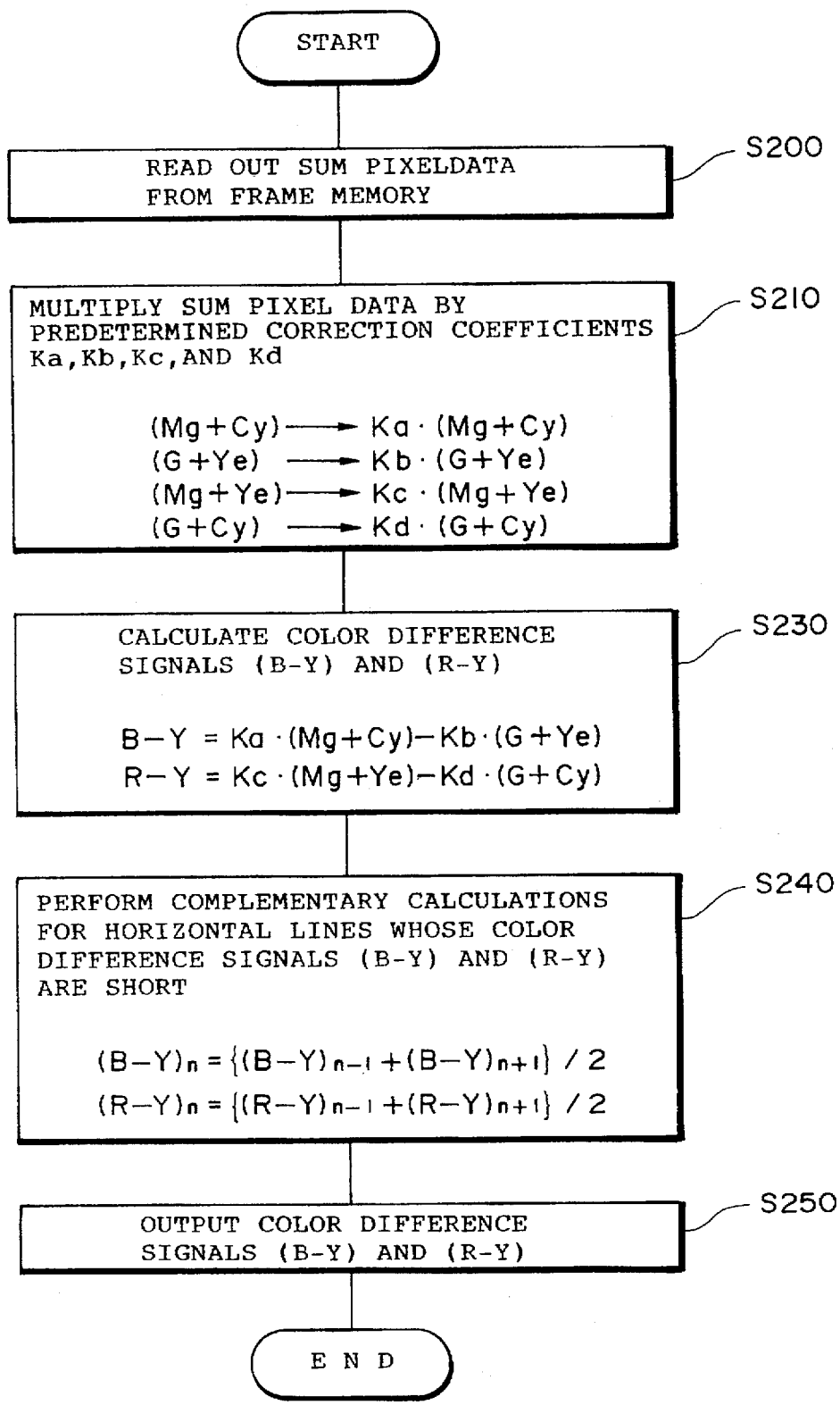
FIG. 9 is a flow chart for explaining white balance adjustment and color difference signal formation in image reproduction.

When the operator designates reproduction of a still image upon completion of photography, processing in FIG. 9 is started. More specifically, an arithmetic processing program stored in the program memory 110 is executed by the arithmetic operation unit 108 as follows.

In step S200, the arithmetic operation unit 108 reads out the sum pixel data $D_{CCD}$ of the designated frame image in a predetermined order from the frame memory 106 or the expanded memory 106'. The sum pixel data $D_{CCD}$ are read out rightward for columns and downward for rows in accordance with the order of array shown in FIG. 7.

In steps S210 and S230, the arithmetic operation unit 108 multiplies the respective sum pixel data $D_{CCD}$ by predetermined coefficients Ka, Kb, Kc, and Kd to obtain first and second color difference signals (B-Y) and (R-Y), as shown in equations (1) to (4) below. Note that the correction coefficients Ka, Kb, Kc, and Kd are coefficients for adjusting white balance and are determined so that the color difference signals (R-Y) and (B-Y) become zero when an achromatic object is photographed under a given photographic condition.

$$(B-Y)=Ka\times(Mg+Cy)-Kb\times(G+Ye) \quad (1)$$

$$(R-Y)=Kc\times(Mg+Ye)-Kd\times(G+Cy) \quad (2)$$

$$(B-Y)_n=\{(B-Y)_{n-1}+(B-Y)_{n+1}\}/2 \quad (3)$$

$$(R-Y)_{n+1}=\{(R-Y)_n+(R-Y)_{n+2}\}/2 \quad (4)$$

Equations (1) to (4) above will be described in detail below. In normal white balance adjustment, the sum pixel data (Mg+Cy), (G+Ye), (Mg+Ye), and (G+Cy) are simply multiplied by the unique correction coefficients Ka, Kb, Kc, and Kd, respectively, thereby adjusting the balance. In this embodiment, however, according to the spectral sensitivity characteristics of a color filter in photography under a normal illumination light source, the value of the sum pixel data (Mg+Ye) becomes maximum. In view of this fact, the correction coefficient Kc for the sum pixel data (Mg+Ye) is kept constant as Kc=1, and the remaining correction coefficients Ka, Kb, and Kd serve as proportional coefficients corresponding to Kc=1. As a result, the multiplication of the correction coefficient Kc in the first term on the right-hand side of equation (2) can be omitted. The calculation using equation (2) is thus actually performed as follows:

$$(R-Y)=(Mg+Ye)-Kd\times(G+Cy) \quad (2')$$

Although four sum pixel data (Mg+Cy), (G+Ye), (Mg+Ye), and (G+Cy) must be multiplied by four correction coefficients Ka, Kb, Kc, and Kd, respectively, in the conventional white balance adjustment, three sum pixel data (Mg+Cy), (G+Ye), and (G+Cy) need only be multiplied by three correction coefficients Ka, Kb, and Kd, respectively, thereby realizing high-speed arithmetic processing.

In addition, the color difference signals (B-Y) and (R-Y) obtained by equations (1) and (2) alternately correspond to each other in units of horizontal lines, as can be apparent from the array in FIG. 7. A color difference signal (R-Y) cannot be obtained for a horizontal line for which color difference signal (B-Y) is obtained, whereas a color difference signal (B-Y) cannot be obtained for a horizontal line for which color difference signal (R-Y) is obtained.

More specifically, the first color difference signal (B-Y) obtained by equation (1) corresponds to, e.g., the nth and (n+2)th horizontal lines, but cannot correspond to the (n+1) th and (n+3)th horizontal lines in FIG. 7. To the contrary, the second color difference signal (R-Y) corresponds to the (n+1)th and (n+3)th horizontal lines, but cannot correspond to the nth and (n+2)th horizontal lines in FIG. 7.

In this state, color information cannot be obtained for all pixels in image reproduction. This degrades color reproducibility.

In this embodiment, the color signals of horizontal lines which cannot be calculated by equations (1) and (2) are complementarily obtained by equations (3) and (4). More specifically, the color difference signals $(B-Y)_{n-1}$, $(B-Y)_{n+1}$, ... of odd horizontal lines (n-1, n+1, ...) are obtained by equation (1), and the color difference signals $(R-Y)_n$, $(R-Y)_{n+2}$, ... of even horizontal lines (n, n+2, ...) are obtained by equation (2). By using equation (4), a color difference signal $(R-Y)_{n+1}$ of an odd horizontal line (e.g., n+1) is obtained by the average of the sum of the color difference signals $(R-Y)_n$ and $(R-Y)_{+2}$ of even horizontal lines adjacent to the odd line n+1. In addition, by using equation (3), a color difference signal $(B-Y)_n$ of an even horizontal line (e.g., n) is obtained by the average of the sum of the color difference signals $(B-Y)_{n-1}$ and $(B-Y)_{n+1}$ of odd horizontal lines adjacent to the even line n.

This complementary operation makes it possible to reproduce an image excellent in color reproducibility in the vertical direction.

The color difference signals (B-Y) and (R-Y) of four typical adjacent pixels are obtained by equations (A-1) to (D-3) below corresponding to equations (1) to (4) above on the basis of the sum pixel data having the array shown in FIG. 7:

(a) Color Difference Signals for Pixel of mth Row and nth Column $$(B-Y)_{m,n}=Ka\times(Mg+Cy)_{m,n}-Kb\times(G+Ye)_{+1,n} \quad (A-1)$$

$$(R-Y)_{m,n}=\{(R-Y)_{m,n-1}+(R-Y)_{m+1,n+1}\}/2 \quad (A-4)$$

(b) Color Difference Signals for Pixel of (m+1)th Row and nth Column $$(B-Y)_{m+1,n}=Ka\times(Mg+Cy)_{m+2,n}-Kb\times(G+Ye)_{m+1,n} \quad (B-1)$$

$$(R-Y)_{m+1,n}=\{(R-Y)_{m+1,n}+(R-Y)_{m+1,n+1}\}/2 \quad (B-4)$$

(c) Color Difference Signals for Pixel of mth Row and (n+1)th Column $$(R-Y)_{m,n+1}=Kc\times(Mg+Ye)_{m+1,n+1}-Kd\times(G+Cy)_{m,n+1} \quad (C-2)$$

$$(B-Y)_{m,n+1}=\{(B-Y)_{m,n}+(B-Y)_{m,n+2}\}/2 \quad (C-3)$$

(d) Color Difference Signals for Pixel of (m+1)th Row and (n+1)th Column $$(R-Y)_{m+1,n+1}=Kc\times(Mg+Ye)_{m+1,n+1}Kd\times(G+Cy)_{m+2,n+1} \quad (D-2)$$

$$(B-Y)_{m+1,n+1}=\{(B-Y)_{m+1,n+1}+(B-Y)_{m+1,n+1}\}/2 \quad (D-3)$$

When the arithmetic processing in steps S230 and S240 is completed, the calculated color difference signals (B-Y) and (R-Y) are output at predetermined timings corresponding to the pixel array in step S250. When a monitor television or the like is connected to the external terminal 112, a color still image is reproduced and displayed.

In this embodiment, since complementary calculations are performed to obtain color difference signals (B-Y) and (R-Y) for all the pixels, white balance adjustment capable of reproducing a color image excellent in color reproducibility in the vertical direction can be realized.

The pixel data of each frame image obtained in photography are stored in the frame memory, and thereafter the color difference signals are formed and output in image reproduction while white balance adjustment of the pixel data of this frame memory is performed by the above arithmetic processing. For this reason, the capacity of the frame memory can be greatly reduced, and at the same time the number of components of hardware such as a conventional 1H delay circuit can be reduced. That is, conventionally, when white balance adjustment and processing for forming color difference signals are to be performed with a color CCD having n x m pixels, the color difference signals (B-Y) and (R-Y) and the luminance component data are stored and held, so that a frame memory having a capacity three times the number of pixels (n×m) is required.

For example, when a pixel color filter pair on, e.g., a B-Y line are taken as an example, the color difference signals (B-Y) of one frame image and the color difference signals (R-Y) of one frame image must be formed and stored using pixel data of magenta (Mg) and cyan (Cy) and of green (G) and yellow (Ye). In addition, a memory of one frame image is required for the luminance component. Therefore, to reproduce a one-frame image, the memory capacity required is tripled.

To the contrary, according to this embodiment, when a pixel color filter pair on a B-Y line are taken as an example, the number of pairs of magenta (Mg) and cyan (Cy) and the number of pairs of green (G) and yellow (Ye) equal those of pixels on one horizontal line. The frame memory need only have a capacity for storing the pixel data of one frame image. Therefore, the storage capacity can be greatly reduced.

In addition, according to this embodiment, pixel data obtained in photography are directly stored in the frame memory. In image reproduction, arithmetic processing for white balance adjustment is performed, so that redundancy of the image data amount can be prevented.

(Second Embodiment)

The second embodiment will be described below. This embodiment is related to an electronic still camera, and the arrangement of the main part will be described with reference to FIG. 10.

Figure 10:
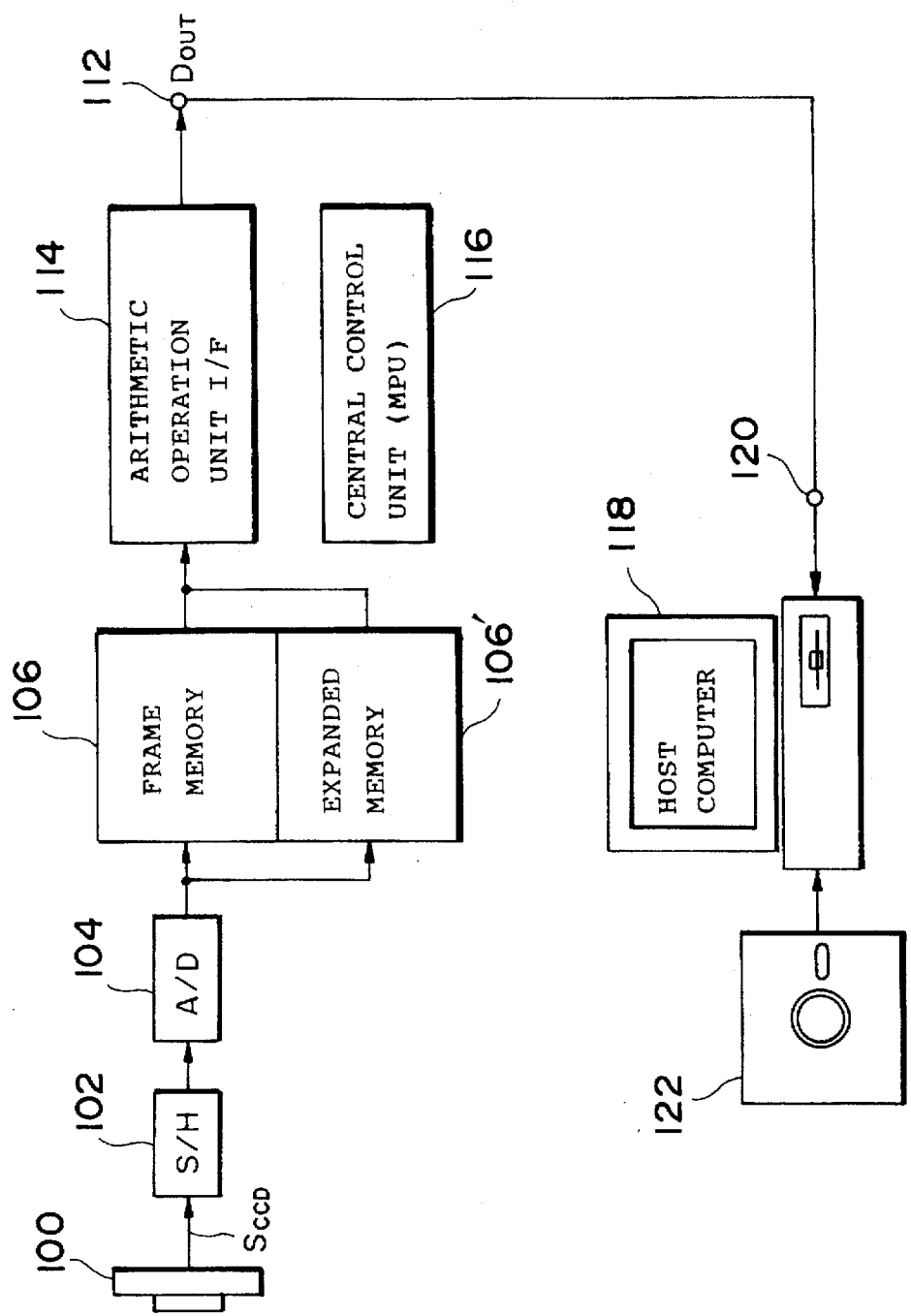
FIG. 10 is a block diagram showing the main part of the second embodiment according to the present invention.

The same reference numerals as in FIG. 5 denote the same or identical parts in FIG. 10. A sum pixel signal $S_{CCD}$ read from a color CCD 100 having the same pixel color filters as in FIG. 6 is converted into digital pixel data $D_{CCD}$ through a sample/hold circuit 102 and an A/D converter 104. The pixel data $D_{CCD}$ is stored in a frame memory 106 or an expanded memory 106' in correspondence with the pixel array of the CCD 100.

This electronic still camera also has a central control unit 116 having a microprocessor and the like for controlling operations in photography and image reproduction. In image reproduction, the pixel data corresponding to the frame image and stored and held in the frame memory 106 or the expanded memory 106' are output to an external terminal 112 through an external output interface 114.

The above constituent components are arranged in the electronic still camera. For example, in image reproduction on the monitor of a host computer 118 such as a so-called personal computer, a predetermined input terminal of the host computer 118 is connected to the external output terminal 112 to receive the pixel data $D_{CCD}$ output from the electronic still camera.

An arithmetic processing program for performing white balance adjustment and color difference signal formation which are described in equations (1) to (4) above is supplied from a so-called floppy disk 122, a memory card, or the like.

The operation of the above embodiment will be described below. In the photographic operation, every time an operator designates one photographic cycle, the operation is performed as in the flow chart of FIG. 8 described with reference to the first embodiment. The pixel data $D_{CCD}$ corresponding to the still image of an object are stored and held in the frame memory 106 or the expanded memory 106'.

When the operator designates image reproduction, the central control unit 116 controls read access for the pixel data $D_{CCD}$ to the frame memory 106 or the expanded memory 106' to transfer the pixel data $D_{CCD}$ corresponding to the pixel array of the color CCD 100 to the host computer 118 through the external output interface 114 and the terminal 112. Therefore, processing in step S200 in the flow chart of FIG. 9 is performed in this embodiment.

The host computer 118 performs arithmetic processing of the received pixel data $D_{CCD}$ in accordance with equations (1) to (4) above to perform white balance adjustment and formation of color difference signals (B-Y) and (R-Y). A still image is reproduced on the monitor on the basis of these color difference signals (B-Y) and (R-Y). The host computer 118 executes the prestored arithmetic processing program to perform processing in steps S210 to S250 in FIG. 9, thereby reproducing an image on the monitor.

According to the second embodiment, white balance adjustment capable of reproducing an image excellent in color reproducibility in the vertical direction can be realized. In addition, the pixel data of each frame image obtained in photography are stored in the frame memory, and thereafter an external device such as a host computer forms the color difference signals in image reproduction while performing white balance adjustment of the sum pixel data of the frame memory using the above arithmetic processing. Therefore, there can be realized an electronic still camera in which the capacity of the memory can be greatly reduced, and at the same time, the number of components of hardware such as a conventional 1H delay circuit can be reduced.

According to the first and second embodiments, since the pixel data of one frame image are stored in the frame memory, the average values of all or some (within a specific range) of the pairs of pixel color filters (Mg and Cy), (G and Ye), (G and Cy), and (Mg and Ye) in the memory are calculated under the condition that the total average of an object image is given as achromatic color although chromatic localization is partially present in the object image. So-called automatic white balance adjustment can be easily realized by calculating the correction coefficients Ka, Kb, Kc, and Kd to satisfy (R-Y)=(B-Y)=0, thereby automatically setting white balance unique to the object image, without requiring a special circuit.

(Third Embodiment)

The third embodiment according to the present invention will be described with reference to the accompanying drawings. This embodiment is related to an electronic still camera for electronically picking up the image of an object.

The arrangement of the main part of this electronic still camera will be described with reference to FIG. 11. A sample/hold circuit (S/H) 202 and an A/D converter 204 are sequentially connected in series with the output contact of a two-dimensional color solid-state image pickup element (color CCD) 200. A frame memory 206 comprising a so-called SRAM for storing at least one-frame image data is connected to the output contact of the A/D converter 204. An arithmetic operation unit 210 having an arithmetic operation function and comprising a microprocessor (MPU) is connected to the output contact of the frame memory 206. An external terminal (i.e., a terminal for connected to an external device through a plug) 214 arranged on the housing or the like of the electronic still camera is connected to the output contact of the arithmetic operation unit 210.

The electronic still camera also has a nonvolatile memory (to be referred to as a ROM hereinafter) 208 for storing data of white balance correction coefficients La, Lb, Lc, and Ld (to be referred to as reference correction coefficient data hereinafter) used in arithmetic processing for correcting variations in optical characteristics of the individual cameras. The reference correction coefficient data La, Lb, Lc, and Ld are read out from the ROM 208 in accordance with an instruction from the arithmetic operation unit 210. The reference correction coefficient data La, Lb, Lc, and Ld represent coefficient values to set the color difference components (B-Y) and (R-Y) to be zero when an achromatic object is photographed under a reference color temperature light source. These values are unique to the respective cameras.

Note that although the A/D converter 204, the frame memory 206, the ROM 208, and the arithmetic operation unit 210 are connected through the individual data transfer paths, respectively, the A/D converter 204, the frame memory 206, and the ROM 208 are actually connected through a so-called data bus extending from the arithmetic operation unit 210. The arithmetic operation unit 210 controls the respective components on the basis of predetermined synchronization timings, so that data can be transferred between these constituent components 204, 206, 208, and 210.

An expanded memory 206' which is of the same type as that of the frame memory 206 may be connected to a memory expansion connector (not shown) connected to the above data bus to store data of a large number of frames. Alternatively, a memory card or a dedicated external memory device 206' may be connected in place of the memory, thereby storing pixel data of a large number of frames.

A program memory 212 which stores the arithmetic processing program for executing white balance adjustment (to be described later) and the data of color temperature correction coefficients Ca, Cb, Cc, and Cd used in this arithmetic processing is connected to the arithmetic operation unit 210. The reference correction coefficient data La, Lb, Lc, and Ld in the ROM 208 and the color temperature correction coefficients Ca, Cb, Cc, and Cd in the program memory 212 are applied to the pixel data $D_{CCD}$ in the frame memory 206 or the expanded memory 206' on the basis of the arithmetic processing program to perform white balance adjustment. The color difference signals (B-Y) and (R-Y) formed on the basis of the pixel data whose white balance is adjusted are output to the external terminal 214. Note that reference symbol $D_{out}$ in FIG. 11 is represented as data including both the color difference signals (B-Y) and (R-Y) for the descriptive convenience.

The color temperature correction coefficients Ca, Cb, Cc, and Cd are coefficients for obtaining appropriate white balance correction coefficients obtained when an achromatic object is photographed under various color temperature light sources. More specifically, since the reference correction coefficient data prestored in the ROM 208 represent reference values obtained when an achromatic object is photographed under the reference color temperature light source, the reference correction coefficient data La, Lb, Lc, and Ld are multiplied by the color temperature correction coefficients Ca, Cb, Cc, and Cd obtained in actual photography to obtain appropriate white balance correction coefficients (CaLa), (CbLb), (CcLc), and (CdLd) under an actual color temperature light source, thereby performing white balance adjustment coping with the actual photography. These color temperature correction coefficients Ca, Cb, Cc, and Cd are stored, in the program memory 212, as a plurality of types of data corresponding to different color temperatures in advance prior to photography so as to cope with appropriate photography under various color temperature light sources.

An external storage medium such as a so-called floppy disk or memory card which stores the above arithmetic processing program and the color temperature correction coefficients Ca, Cb, Cc, and Cd is mounted in a drive unit (not shown) arranged in the housing of this electronic still camera. When an operator inputs a predetermined instruction, the arithmetic processing program and the color temperature correction coefficients Ca, Cb, Cc, and Cd may be written in the program memory 212 through the arithmetic operation unit 210, the arithmetic processing program may be updated to a new arithmetic processing program, or the color temperature correction coefficients Ca, Cb, Cc, and Cd may be added or updated.

A read-only memory or rewritable E²PROM which prestores the arithmetic processing program and the color temperature correction coefficients Ca, Cb, Cc, and Cd may be used in place of the random access program memory 212.

As shown in FIG. 12, the color CCD 200 has pixel color filters of four colors, i.e., cyan (Cy), yellow (Ye), magenta (Mg), and green (G) arranged in a predetermined array to perform a color image pickup operation. In addition, in reading pixel signals accumulated in the respective pixels, the pixel signals of two columns are added (mixed), and this sum pixel signal is read as a pixel signal for one horizontal line.

For example, the nth horizontal line includes a first pixel column in which cyan (Cy) and yellow (Ye) are alternately arranged, and a second pixel column in which magenta (Mg) and green (G) are alternately arranged. When the nth horizontal line is scanned to read pixel signals, a sum pixel signal $S_{CCD}$ including, e.g., (Mg+Cy), (G+Ye), (Mg+Cy), (G+Ye), . . . is automatically output depending on the arrangement of the charge transfer path formed in the color CCD 200. More specifically, the sum pixel signal is an analog signal time-serially read in units of pixels and consisting of (Mg+Cy), (G+Ye), (Mg+Cy), and (G+Ye). Any other horizontal line is also constituted by two pixel group columns as in the nth horizontal line. The sum pixel signals $S_{CCD}$ output from the color CCD 200 are output in an array of FIG. 13 with respect to the pixel array in FIG. 12.

Figure 14:
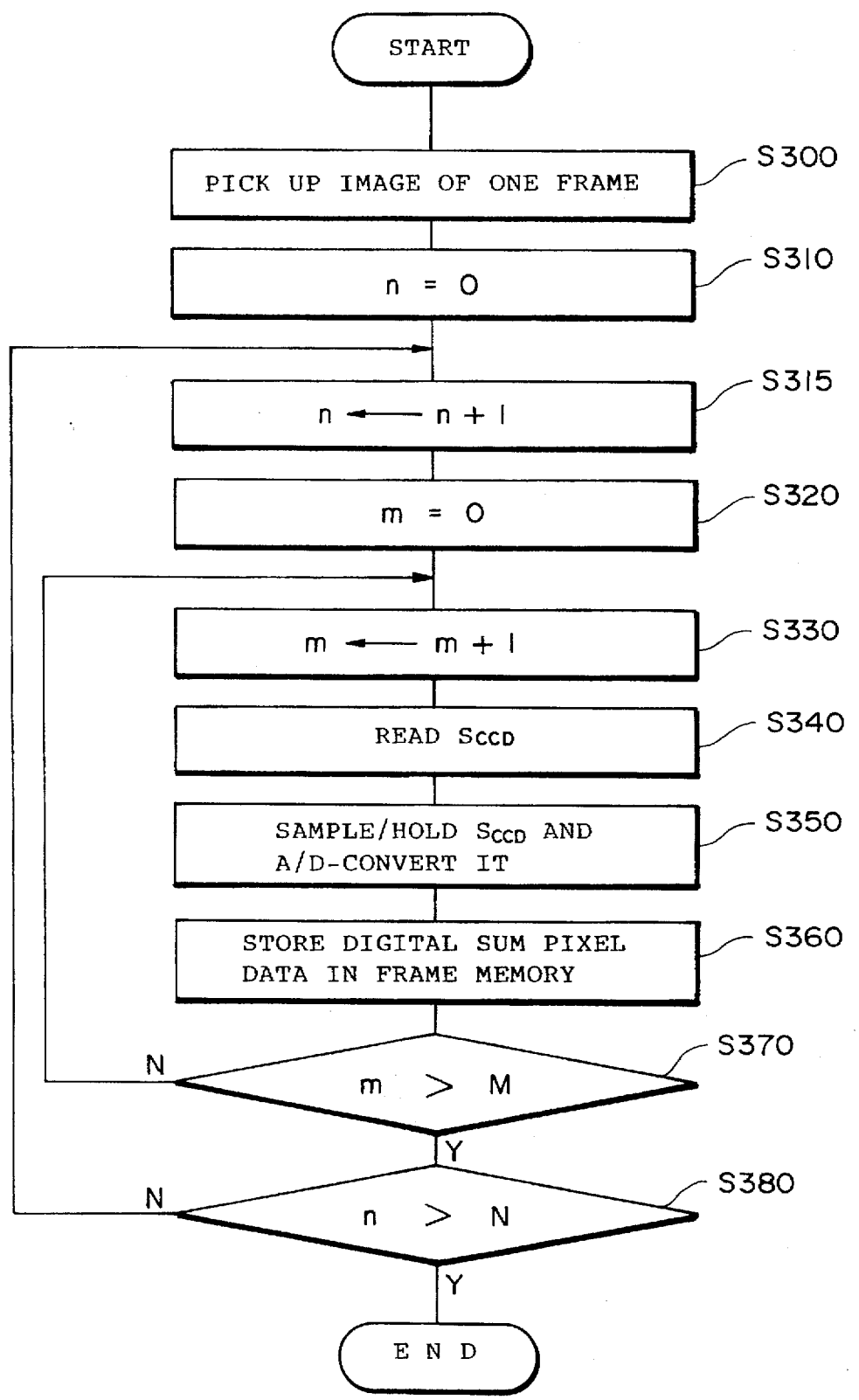
FIG. 14 is a flow chart showing an example of the image pickup operation of the third embodiment.
Figure 15:
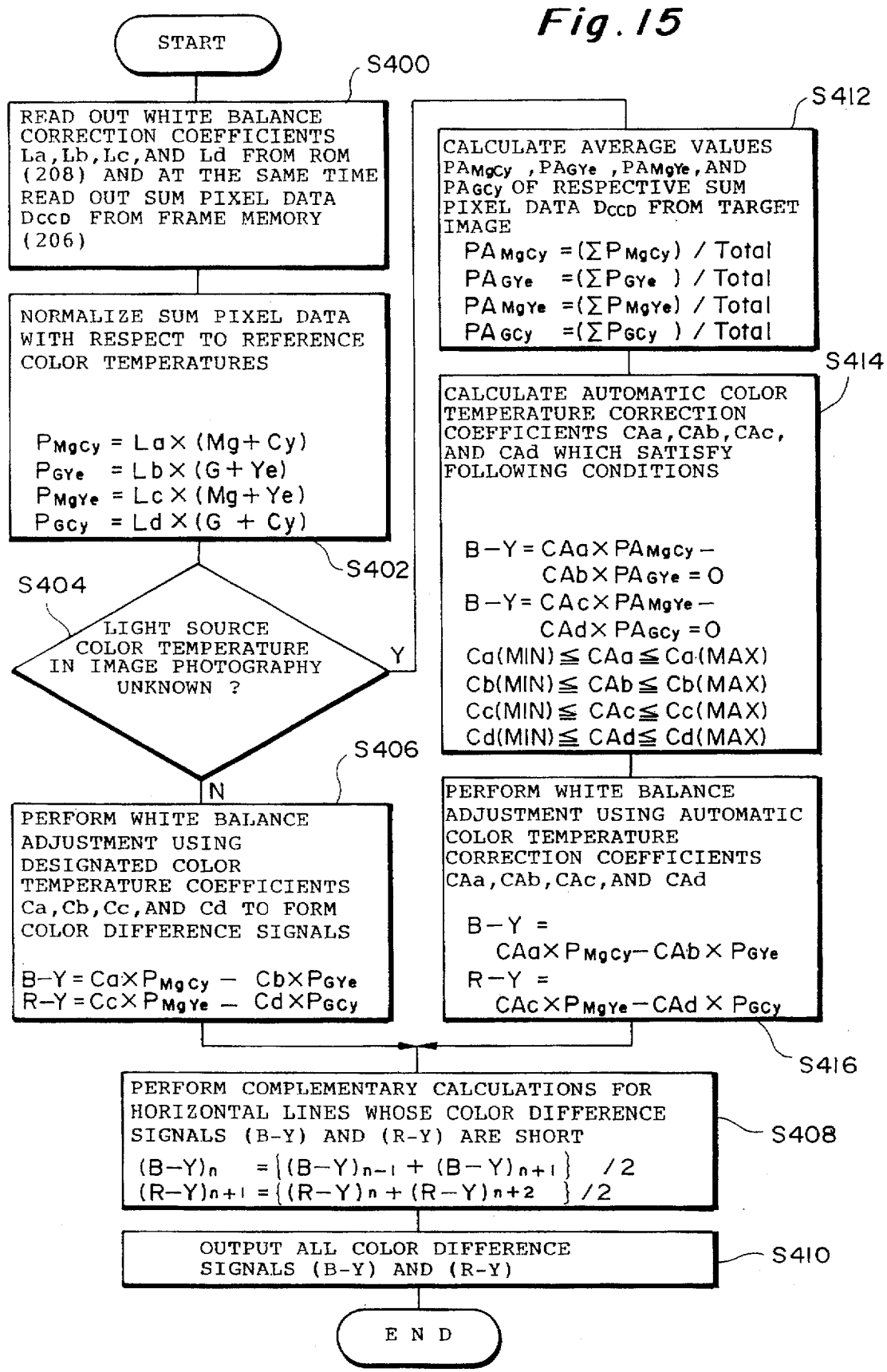
FIG. 15 is a flow chart for explaining white balance adjustment and color difference signal formation in image reproduction according to the third embodiment.

The operation of the electronic still camera having the above arrangement will be described with reference to flow charts in FIGS. 14 and 15. FIG. 14 shows the operation for photographing a one-frame still image, and FIG. 15 shows the operation for performing white balance adjustment and the like.

Referring to FIG. 14, when the operator depresses the shutter release button, a one-frame image is picked up by the color CCD 200 in step S300 to accumulate pixel charges corresponding to the object image in a pixel group. In steps S310 to S330, variables n and m are set. In step S340, pixel signals are read in a predetermined order corresponding to the pixel array (n,m). More specifically, in step S340, each pixel charge is transferred inside the color CCD 200, and the sum pixel signal $S_{CCD}$ is read in synchronism with a predetermined dot sequential timing $\tau_p$.

In step S350, each sum pixel signal $S_{CCD}$ read in synchronism with the dot sequential timing $\tau_p$ is sampled and held in the sample/hold circuit 202 and at the same time converted into sum pixel data $D_{CCD}$ of a predetermined gradation level by the A/D converter 204. In step S360, the sum pixel data $D_{CCD}$ are sequentially stored and held in the frame memory 206. In steps S370 and S380, it is determined whether an operation for reading all the sum pixel signals $S_{CCD}$ of one frame is completed. Processing in steps S320 to S360 is repeated until the read operation is completed. If YES in step S380, a series of image pickup operations are completed.

When the above photographic operation is performed, the sum pixel data $D_{CCD}$ corresponding to the array of the sum pixel signals $S_{CCD}$ are stored in the frame memory 206, as shown in FIG. 13. Since these sum pixel data $D_{CCD}$ are obtained by A/D-converting the sum pixel data $S_{CCD}$ by the A/D converter 204, the sum pixel data $D_{CCD}$ are stored in the frame memory 206 while the white balance of the data $D_{CCD}$ is not adjusted yet. When photography is started upon designating the expanded memory 206', the sum pixel data $D_{CCD}$ of one frame image are stored in the expanded memory 206'. When the second or subsequent still image is photographed, the sum pixel data $D_{CCD}$ corresponding to the second or subsequent frame are stored in the expanded memory 206'.

When the operator designates reproduction of a still image upon completion of photography, processing in FIG. 15 is started. More specifically, an arithmetic processing program stored in the program memory 212 is executed by the arithmetic operation unit 210 as follows.

In step S400, the arithmetic operation unit 210 reads out the reference correction coefficient data La, Lb, Lc, and Ld from the ROM 208 and at the same time reads out the sum pixel data $D_{CCD}$ of the designated frame image in a predetermined order from the frame memory 206 or the expanded memory 206'. The sum pixel data $D_{CCD}$, are read out rightward for columns and downward for rows in accordance with the order of array shown in FIG. 13.

As will be shown in equations (1-a) to (1-d) below, in step S402, the sum pixel data (Mg+Cy) of magenta (Mg) and cyan (Cy), the sum pixel data (G+Ye) of green (G) and yellow (Ye), the sum pixel data (Mg+Ye) of magenta (Mg) and yellow (Ye), and the sum pixel data (G+Cy) of green (G) and cyan (Cy) are multiplied by the reference correction coefficients La, Lb, Lc, and Ld, respectively, to obtain normalized sum pixel data $P_{MgCy}$, $P_{GYe}$, $P_{MgYe}$, and $P_{GCy}$ whose white balances are basically adjusted:

$$P_{MgCy}=La\times(Mg+Cy) \quad (1\text{-}a)$$

$$P_{GYe}=Lb\times(G+Ye) \quad (1\text{-}b)$$

$$P_{MgYe}=Lc\times(Mg+Ye) \quad (1\text{-}c)$$

$$P_{GCy}=Ld\times(G+Cy) \quad (1\text{-}d)$$

In step S404, it is determined whether the light source color temperature in image photography is detected. If appropriate color temperature correction coefficients Ca, Cb, Cc, and Cd for the detected light source color temperature are present in the program memory 212, the flow advances to step S406; otherwise, the flow advances to step S412.

In step S406, as will be shown in equations (2-a) and (2-b) below, the normalized sum pixel data $P_{MgCy}$, $P_{GYe}$, $P_{MgYe}$, and $P_{GCy}$ are multiplied by the appropriate color temperature correction coefficients Ca, Cb, Cc, and Cd read out from the program memory 212 to perform white balance adjustment corresponding to an actual photographic state. In addition, color difference signals (B-Y) and (R-Y) are obtained on the basis of the white-balance-adjusted sum pixel data:

$$B\text{-}Y=Ca\times P_{MgCy}-Cb\times P_{GYe} \quad (2\text{-}a)$$

$$R\text{-}Y=Cc\times P_{MgYe}-Cd\times P_{GCy} \quad (2\text{-}b)$$

In accordance with the arithmetic operations using equations (1-a) to (1-d) and (2-a) and (2-b), the white balance adjustment of the sum pixel data (Mg+Cy), (G+Ye), (Mg+Ye), and (G+Cy) is realized by the white balance correction coefficients (Ca×La), (Cb×Lb), (Cc×Lc), and (Cd×Ld) corresponding to the actual photographic state.

In step S408, complementary processing is performed to compensate for pixels whose color difference signals (B-Y) and (R-Y) cannot be calculated.

The color difference signals (B-Y) and (R-Y) obtained by equations (2-a) and (2-b) above alternately correspond to each other in units of horizontal lines, as can be apparent from the array in FIG. 13. A color difference signal (R-Y) cannot be obtained for a horizontal line for which color difference signal (B-Y) is obtained, whereas a color difference signal (B-Y) cannot be obtained for a horizontal line for which color difference signal (R-Y) is obtained. More specifically, the first color difference signal (B-Y) obtained by equation (2-a) corresponds to, e.g., the nth and (n+2)th horizontal lines, but cannot correspond to the (n+1)th and (n+3)th horizontal lines in FIG. 13. To the contrary, the second color difference signal (R-Y) corresponds to (n+1)th and (n+3)th horizontal lines, but cannot correspond to the nth and (n+2)th horizontal lines in FIG. 13. In this state, color information cannot be obtained for all pixels in image reproduction. This degrades color reproducibility.

In this embodiment, the color signals of horizontal lines which cannot be calculated by equations (2-a) and (2-b) above are complementarily obtained by the following equations (3-a) and (3-b):

$$(B\text{-}Y)_n=\{(B\text{-}Y)_{n-1}+(B\text{-}Y)_{n+1}\}/2 \quad (3\text{-}a)$$

$$(R\text{-}Y)_{n+1}=\{(R\text{-}Y)_n+(R\text{-}Y)_{n+2}\}/2 \quad (3\text{-}b)$$

This complementary operation makes it possible to reproduce an image excellent in color reproducibility in the vertical direction.

When arithmetic processing in steps S400 to S408 is completed, the calculated color difference signals (B-Y) and (R-Y) are output at predetermined timings corresponding to the pixel array in step S410. When a monitor television or the like is connected to the external terminal 214, a color still image is reproduced and displayed.

In this embodiment, since complementary calculations are performed to obtain color difference signals (B-Y) and (R-Y) for all the pixels, white balance adjustment capable of reproducing a color image excellent in color reproducibility in the vertical direction can be realized.

When it is determined in step S404 that appropriate color temperature correction coefficients in actual photography are unknown, the flow advances to step S412. After appropriate color temperature correction coefficients are predicted and calculated in steps S412 and S414, white balance adjustment is performed on the basis of the predicted color temperature correction coefficients (to be referred to as automatic color temperature correction coefficients hereinafter) in step S416.

In step S412, as will be shown in equations (4-a) to (4-d) below, average values $PA_{MgCy}$, $PA_{GYe}$, $PA_{MgYe}$, and $PA_{GCy}$ of the total sums of the sum pixel data $P_{MgCy}$, $P_{GYe}$, $P_{MgYe}$ and $P_{GCy}$ of magenta (Mg) and cyan (Cy), green (G) and yellow (Ye), magenta (Mg) and yellow (Ye), and green (G) and cyan (Cy) obtained in step S402. A coefficient Total is the number of sum pixel data per color:

$$PA_{MgCy}=(\Sigma P_{MgCy})/\text{Total} \quad (4\text{-}a)$$

$$PA_{GYe}=(\Sigma P_{GYe})/\text{Total} \quad (4\text{-}b)$$

$$PA_{MgYe}=(\Sigma P_{MgYe})/\text{Total} \quad (4\text{-}c)$$

$$PA_{GCy}=(\Sigma P_{GCy})/\text{Total} \quad (4\text{-}d)$$

In step S414, the average values $PA_{MgCy}$, $PA_{GYe}$, $PA_{MgYe}$, and $PA_{GCy}$ of the sums which are obtained in equations (4-a) to (4-d) above are applied to the next conditions (5-a) and (5-b), and at the same time automatic color temperature correction coefficients CAa, CAb, CAc, and CAd for each color which satisfy conditions (6-a) to (6-d) below are calculated:

$$B\text{-}Y=CAa\times PA_{MgCy}-CAb\times PA_{GYe}=0 \quad (5\text{-}a)$$

$$R\text{-}Y=CAc\times PA_{MgYe}-CAd\times PA_{GCy}=0 \quad (5\text{-}b)$$

$$Ca(MIN)\leq CAa \leq Ca(MAX) \quad (6\text{-}a)$$

$$Cb(MIN)\leq CAb \leq Cb(MAX) \quad (6\text{-}b)$$

$$Cc(MIN)\leq CAc \leq Cc(MAX) \quad (6\text{-}c)$$

$$Cd(MIN)\leq CAd \leq Cd(MAX) \quad (6\text{-}d)$$

That is, as shown in conditions (5-a) and (5-b), when a condition (achromatic color) for setting both the color difference signals (B-Y) and (R-Y) to zero for a target image is satisfied, the corresponding automatic color temperature correction coefficients CAa, CAb, CAc, and CAd serve as appropriate white balance correction coefficients. The average values $PA_{MgCy}$, $PA_{GYe}$, $PA_{MgYe}$, and $PA_{GCy}$ of the sums for the respective colors in the entire image are applied to conditions (5-a) and (5-b) to predict and calculate automatic color temperature correction coefficients CAa, CAb, CAc, and CAd.

The color distribution of a given image may be localized in a specific color. In this case, even if the automatic color temperature correction coefficients CAa, CAb, CAc, and CAd are simply obtained from conditions (5-a) and (5-b), a balance with the color temperature distribution of an actual photographic light source may be disturbed. To prevent this, the automatic color temperature correction coefficients CAa, CAb, CAc, and CAd are limited not to exceed the range of color temperature correction coefficients Ca, Cb, Cc, and Cd of a predetermined number of light sources (conditions (6-a) to (6-d)).

When the minimum and maximum values of the prepared color temperature correction coefficients Ca, Cb, Cc, and Cd are Ca(MIN), Ca(MAX), Cb(MIN), Cb(MAX), Cc(MIN), Cc(MAX), Cd(MIN), and Cd(MAX), respectively, the automatic color temperature correction coefficients CAa, CAb, CAc, and CAd limited within the range of conditions (6-a) to (6-d) are employed.

In step S416, as will be shown in the following equations (7-a) and (7-b), the sum pixel signals $P_{MgCy}$, $P_{GYe}$, $P_{MgYe}$, and $P_{GCy}$ are multiplied by the automatic color temperature correction coefficients CAa, CAb, CAc, and CAd to perform white balance adjustment, and at the same time, color difference signals (B-Y) and (R-Y) are obtained:

$$B\text{-}Y = CAa \times PA_{MgCy} - CAb \times PA_{GYe} \qquad (7\text{-}a)$$

$$R\text{-}Y = CAc \times PA_{MgYe} - CAd \times PA_{GCy} \qquad (7\text{-}b)$$

Processing in steps S408 and S410 is performed to complementarily obtain color difference signals which cannot be obtained by equations (7-a) and (7-b) (see equations (3-a) and (3-b)). These color difference signals are output through the external terminal 214.

When a display device such as a monitor is connected to the external terminal 214, the image can be reproduced and displayed.

The pixel data of each frame image obtained in photography are stored in the frame memory, and thereafter color difference signals are formed and output in image reproduction while white balance adjustment of the pixel data of this frame memory is performed by the above arithmetic processing. For this reason, the capacity of the frame memory can be greatly reduced, and at the same time the number of components of hardware such as a conventional 1H delay circuit can be reduced.

Figure 16:
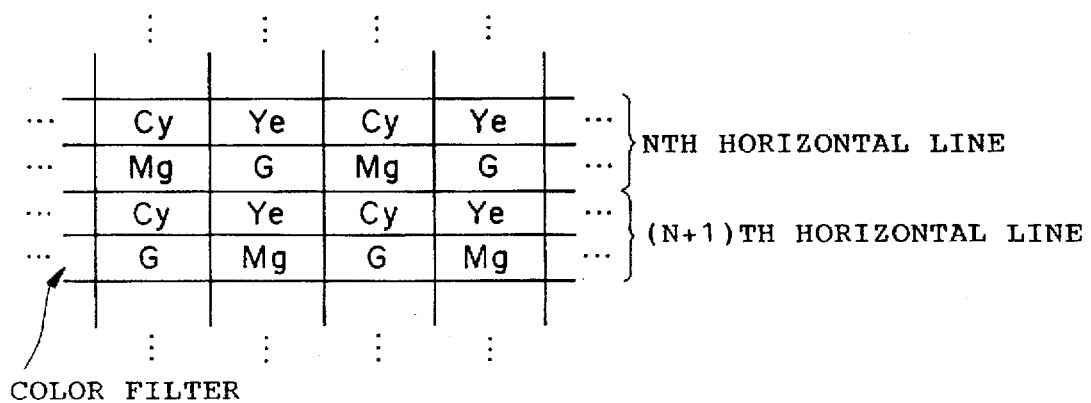
FIG. 16 is a view for explaining part of the light-receiving surface of a color CCD applied to the third embodiment.

That is, conventionally, when white balance adjustment and processing for forming color difference signals are to be performed in a camera for performing an image pickup operation using a color CCD having n×m pixels, the color difference signals (B-Y) and (R-Y) and the luminance component data are stored and held, so that a frame memory having a capacity three times the number of pixels (n×m) is required. For example, when a pixel color filter pair on, e.g., a B-Y line shown in FIG. 16 are taken as an example, the color difference signals (B-Y) of one frame image and the color difference signals (R-Y) of one frame image must be formed and stored using pixel data of magenta (Mg) and cyan (Cy) and of green (G) and yellow (Ye). In addition, a memory of one frame image is required for the luminance component. Therefore, to reproduce a one-frame image, the memory capacity is tripled.

To the contrary, according to this embodiment, when a pixel color filter pair on a B-Y line are taken as an example, the number of pairs of magenta (Mg) and cyan (Cy) and the number of pairs of green (G) and yellow (Ye) equal those of pixels on one horizontal line. The frame memory need only have a capacity for storing the pixel data of one frame image. Therefore, the storage capacity can be greatly reduced.

In addition, according to this embodiment, pixel data obtained in photography are directly stored in the frame memory. In image reproduction, arithmetic processing for white balance adjustment is performed, so that redundancy of the image data amount can be prevented.

In this embodiment, white balance correction coefficients La, Lb, Lc, and Ld unique to each camera are prestored in the ROM 208 as reference correction coefficient data. The first white balance adjustment of the sum pixel data $D_{CCD}$ is performed using these correction coefficients La, Lb, Lc, and Ld (see step S402). In addition, the second white balance adjustment is performed using color temperature correction coefficients Ca, Cb, Cc, and Cd corresponding to the actual light source color temperature (see steps S406 and S414). Since the color temperature correction coefficients Ca, Cb, Cc, and Cd can be input from an external storage medium, these color temperature correction coefficients Ca, Cb, Cc, and Cd need not be stored in the camera. These coefficients can be newly added or updated. Therefore, there is provided an electronic still camera excellent in expansibility.

Even if color temperature correction coefficients Ca, Cb, Cc, and Cd corresponding to an unpredicted light source color temperature are not set, automatic color temperature correction coefficients CAa, CAb, CAc, and CAd can be automatically predicted and calculated to perform white balance adjustment (see steps S412 to S416). Therefore, an appropriate photographic operation coping with the actual photographic state can be realized, resulting in a great advantage.

Note that although the average values $PA_{MgCy}$, $PA_{GYe}$, $PA_{MgYe}$, and $PA_{GCy}$ of the sums of all the sum pixel data of one frame image are obtained in the description in step S412 of FIG. 15 in order to calculate the automatic color temperature correction coefficients CAa, CAb, CAc, and CAd, the present invention is not limited to this arithmetic processing. For example, the average values of sums of sum pixel data falling within a predetermined range, e.g., a predetermined field angle range (e.g., the predetermined range from the center of the frame image) may be defined as $PA_{MgCy}$, $PA_{GYe}$, $PA_{MgYe}$, and $PA_{GCy}$.

(Fourth Embodiment)

The fourth embodiment will be described below. This embodiment is related to an electronic still camera, and the arrangement of its main part will be described with reference to FIG. 17.

Figure 17:
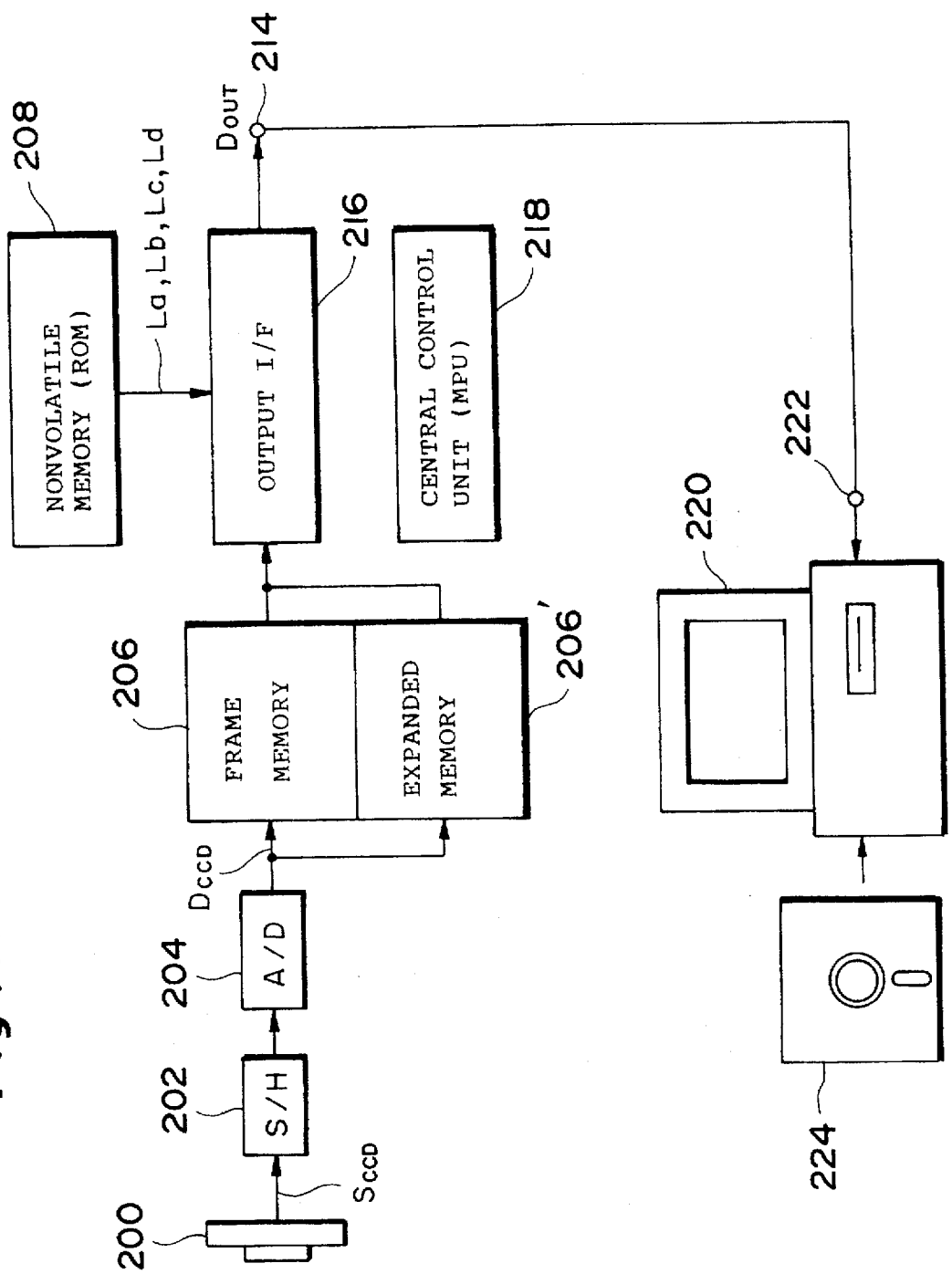
FIG. 17 is a block diagram showing the main part of the fourth embodiment according to the present invention.

The same reference numerals as in FIG. 11 denote the same or identical parts in FIG. 17. A sum pixel signal $S_{CCD}$ read from a color CCD 200 having the same pixel color filters as in FIG. 12 is converted into digital pixel data $D_{CCD}$ through a sample/hold circuit 202 and an A/D converter 204. The pixel data $D_{CCD}$ is stored in a frame memory 206 or an expanded memory 206' in correspondence with the pixel array of the CCD 200. In addition, the electronic still camera has a ROM 208 which prestores reference correction coefficient data La, Lb, Lc, and Ld for the white balance correction coefficients.

This electronic still camera also has a central control unit 218 having a microprocessor and the like for controlling operations in photography and image reproduction. In image reproduction, pixel data corresponding to the frame image and stored and held in the frame memory 206 or the expanded memory 206' are output to an external terminal 214 through an external output interface 216.

The above constituent components are arranged in the electronic still camera. For example, in image reproduction on the monitor of a host computer 220 such as a so-called personal computer, a predetermined input terminal 222 of the host computer 220 is connected to the external output terminal 214 to receive the pixel data $D_{CCD}$ output from the electronic still camera.

The data of a plurality of color temperature correction coefficients Ca, Cb, Cc, and Cd for various light source color temperatures and an arithmetic processing program for white balance adjustment and color difference signal formation described with reference to equations (1-a) to (7-b) are supplied in advance to the host computer 220 through a so-called floppy disk 224, a memory card, or the like.

The operation of this embodiment will be described below. The photographic operation is performed in the same manner as in the flow chart of FIG. 14 described with reference to the third embodiment every time an operator designates a photographic cycle. The pixel data $D_{CCD}$ corresponding to the still image of an object are stored and held in the frame memory 206 or the expanded memory 206'.

When the operator designates image reproduction, the central control unit 218 reads out the reference correction coefficient data La, Lb, Lc, and Ld from the ROM 208 and also reads out the pixel data $D_{CCD}$ corresponding to one frame image from the frame memory 206 or the expanded memory 206'. The central control unit 218 transfers these reference correction coefficient data La, Lb, Lc, and Ld to the host computer 220 through the external output interface 216 and the external output terminal 214 and at the same time time-serially transfers the pixel data $D_{CCD}$ in correspondence with the pixel array of the color CCD 200.

The host computer 220 performs arithmetic processing of steps S400 to S410 in FIG. 15 for the received reference correction coefficient data La, Lb, Lc, and Ld, the pixel data $D_{CCD}$, and the color temperature correction coefficients Ca, Cb, Cc, and Cd to perform white balance adjustment and form color difference signals (B-Y) and (R-Y). Steps S412 to S416 are performed in place of step S406 to calculate automatic color temperature correction coefficients, thereby performing white balance adjustment and forming the color difference signals (B-Y) and (R-Y). A still image is reproduced on the basis of these color difference signals (B-Y) and (R-Y).

The host computer 220, therefore, executes the prestored arithmetic processing program to perform white balance adjustment and form the color difference signals on the basis of equations (1-a) to (7-b) above.

According to the fourth embodiment, the pixel data of each fame image obtained in photography are stored in the frame memory, and thereafter an external device such as a host computer forms color difference signals in image reproduction while performing white balance adjustment of the sum pixel data of the frame memory using the above arithmetic processing. Therefore, there can be realized an electronic still camera in which the capacity of the memory can be greatly reduced, and at the same time, the number of components of hardware such as a conventional 1H delay circuit can be reduced.

In this embodiment, white balance correction coefficients La, Lb, Lc, and Ld unique to each camera are prestored in the ROM 208 as reference correction coefficient data. When color temperature correction coefficients Ca, Cb, Cc, and Cd corresponding to an actual light source color temperature are stored in an external device such as a host computer, appropriate white balance adjustment can be performed. These coefficients can be newly added or updated. Therefore, there is provided an electronic still camera excellent in expansibility.

Even if color temperature correction coefficients Ca, Cb, Cc, and Cd corresponding to an unpredicted light source color temperature are not set, automatic color temperature correction coefficients CAa, CAb, CAc, and CAd can be automatically predicted and calculated to perform white balance adjustment (see steps S412 to S416). Therefore, an appropriate photographic operation coping with the actual photographic state can be realized, resulting in a great advantage.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 000271/1996 filed on Jan. 5, 1996 and 006615/1996 filed on Jan. 18, 1996 are hereby incorporated by reference.

What is claimed is:

1. An image pickup apparatus comprising:

a color image pickup element in which a first pixel column having a plurality of pixels with cyan and yellow pixel color filters alternately arranged in a horizontal line direction and a second pixel column having a plurality of pixels with magenta and green pixel color filters alternately arranged in the horizontal line direction are alternately arranged in a vertical direction, each pair of said first pixel column and said second pixel column constitute each horizontal line, pixel signals generated by the plurality of pixels are combined in units of first and second pixel columns, and pixel signals of two pixels adjacent in the vertical direction are mixed and output, thereby performing horizontal scanning and reading of a sum pixel signal for each horizontal line;

an A/D converter for converting each sum pixel signal read from said color image pickup element into digital sum pixel data; and a storage medium for storing said sum pixel data output from said A/D converter in correspondence with a pixel arrangement of said color pickup element, wherein an arithmetic operation for adjusting a white balance of said sum pixel data stored in said storage medium is performed, said arithmetic operation comprising:

multiplications of said sum pixel data by white balance adjustment correction coefficients unique thereto, calculation of a first color difference signal of each pixel in accordance with the multiplied sum pixel data corresponding to magenta and cyan and the multiplied sum pixel data corresponding to green and yellow, calculation of a second color difference signal of each pixel in accordance with the multiplied sum pixel data corresponding to magenta and yellow and the multiplied sum pixel data corresponding to green and cyan, adding and averaging said second color difference signals adjacent to each other in the vertical direction to calculate a first complementary color difference signal for a pixel column of said first color difference signal serving as a signal between said second color difference signals, and adding and averaging said first color difference signals adjacent to each other in the vertical direction to calculate a second complementary color difference signal for a pixel column of said second color difference signal serving as a signal between said first color difference signals.

2. An apparatus according to claim 1, wherein the correction coefficients to be multiplied by the sum pixel data corresponding to magenta and yellow serve as reference values, and the correction coefficients to be multiplied by the remaining sum pixel data serve as proportional coefficients with respect to said reference values.

3. An apparatus according to claim 1, further comprising an arithmetic operation unit for performing said arithmetic operation.

4. An apparatus according to claim 1, wherein said arithmetic operation is performed by a computer arranged out of said image pickup apparatus.

5. An apparatus according to claim 1, further comprising another storage medium for storing said sum pixel data output from said A/D converter.

* * * * *